June 18, 1940.      R. L. FEARN      2,204,797
TEMPERATURE MEASURING APPARATUS
Original Filed Jan. 19, 1939

Richard L. Fearn
INVENTOR.

Darby & Darby
Attorneys.

Patented June 18, 1940

2,204,797

UNITED STATES PATENT OFFICE 2,204,797

TEMPERATURE MEASURING APPARATUS

Richard L. Fearn, Rockville, Md., assignor to Syncro Machine Company, Rahway, N. J., a corporation of New Jersey Original application January 19, 1939, Serial No. 251,759. Divided and this application August 2, 1939, Serial No. 287,984

1 Claim. (Cl. 73—341)

This invention relates to improvements in temperature measuring apparatus and is particularly adapted to the measurement of the temperature of a heated, rapidly moving strand, such as a copper wire.

The objects and advantages of this invention will be apparent from the following description when taken in connection with the attached drawing.

This invention resides substantially in the combination, construction, arrangement, and relative location of parts, all in accordance with this disclosure.

This invention is particularly adapted for use with but not limited to use with apparatus of the type disclosed in my co-pending application Serial No. 251,759, filed January 19, 1939, of which this is a divisional application.

Figure 1:
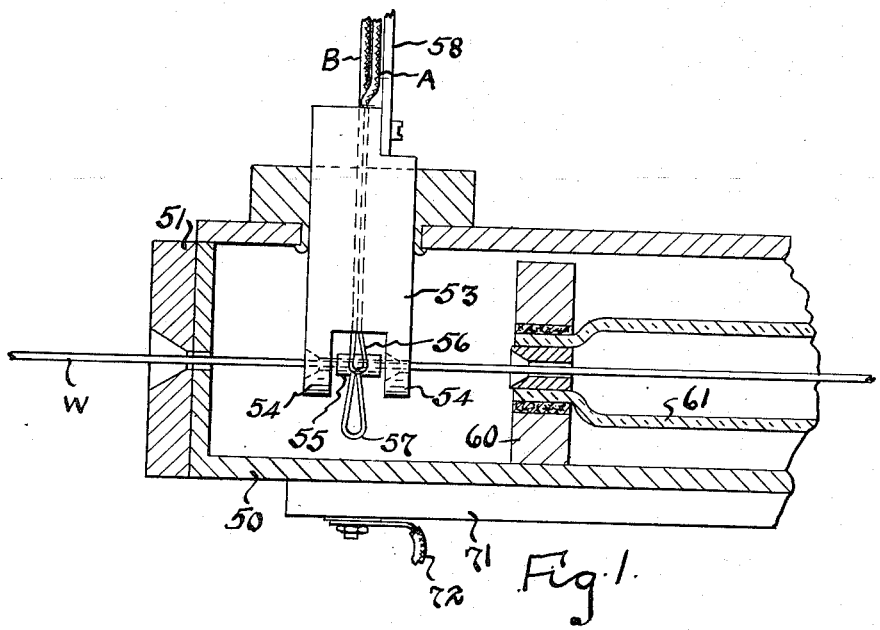
Figure 2:
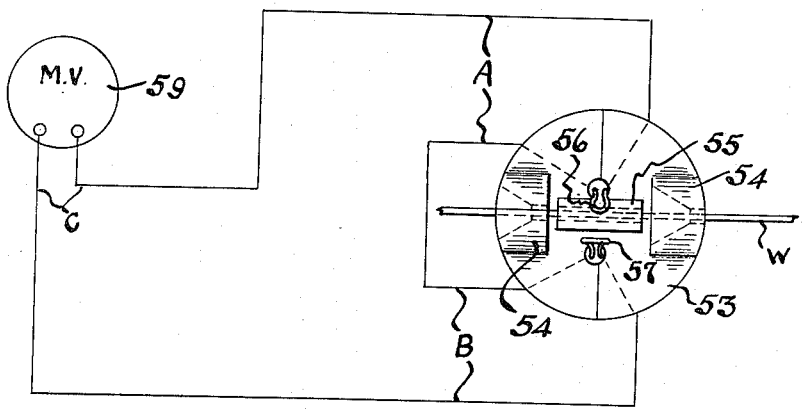

In the accompanying drawing,

Figure 1 is a longitudinal, vertical, central, cross-sectional view through a portion of an apparatus employing this invention; and Figure 2 is a circuit diagram of connections thereof.

In the heat treatment of metallic strands which are moving at high speeds in the direction of their length, it is often desirable, but at the same time extremely difficult, to accurately measure the temperature thereof. Where, as in the case of the method, for example, of the parent application of which this is a division, it is desired to know quite accurately the temperature of a heated, rapidly moving strand, no other satisfactory method or apparatus is known to me for the purpose. As is apparent from the above, the purpose of this invention is to provide an accurate temperature measuring mechanism for providing either directly a reading of the actual temperature of the heated strand taken continuously while it is moving or to provide an indication of the variation of the temperature thereof from a desired value.

In the drawing, a portion of the apparatus disclosed in the parent application is illustrated. It is shown as comprising a casing 50, of any suitable material and preferably heat insulated, which has a small aperture at the left hand end thereof through which the wire W enters as it moves axially. Mounted on the end of the housing is a heavy metal plate 51 having a flaring aperture in alignment with the aperture in the wall of the housing through which the strand may enter thereinto. The function of the plate 51 is of no concern to the invention herein disclosed. Mounted in the housing and spaced from the left hand end wall thereof is a barrier or wall 60 which substantially divides the housing into two compartments. This wall is provided with an aperture in which one end of an inner glass housing 61 is supported and provided with an apertured closure member through which the wire may move into the glass chamber. This chamber likewise is of no importance to the present invention.

In one of the compartments thus formed by the housing and wall is mounted a support 53 which extends through the upper wall of the housing both interiorly and exteriorly thereof. The lower end, that is, the end within the compartment, is provided with a pair of projecting guides 54 which have aligned passages therethrough with ends flaring outwardly towards the direction from which the strand W comes. The apertures in the guides 54 are in alignment with the aperture in the end of the housing and the passage into the chamber 61. Thus the strand W may move in a straight line from the heating apparatus at the left, not shown, and while still heated move through the compartment and into the inner chamber 61. Supported between the guides 54 is a short metallic tube 55 which has a central passage therethrough slightly larger than the external diameter of the strand W. Mounted on the support 53 is a thermocouple 56 which is welded to the metallic tube 55 so as not only to support it in the position shown but also to be in heat conductive relation therewith. The leads for this thermocouple extend upwardly of the support 53, as indicated at A, and terminate on suitable binding posts (not shown) mounted on the terminal board 58. A second thermocouple 57 projects down into the compartment so as to be exposed to the heat therein and is provided with a pair of leads B which likewise go to suitable binding posts (not shown) on the terminal board 58.

The connections for this arrangement are illustrated in Figure 2. The thermocouples 56 and 57 are connected in opposition, that is, so that the currents flowing therefrom, if of equal value, nullify each other. One of the leads A and one of the leads B are connected together to secure this result, while the other leads A and B are connected as indicated at C to the indicating meter 59, which may, for example, be a millivolt meter, as indicated by the reference characters M. V. At 71 is diagrammatically illustrated any suitable form of heating mechanism, such as an electric heater, provided with the current supply leads 72 for connection to any suitable source. The heater 71 is provided to aid in maintaining a desired temperature within the chamber 50 including the thermocouple compartment.

With this apparatus in operation and properly adjusted, the thermocouples being connected in series opposition and with the thermocouples at the same temperature, the currents generated by them are equal and opposed so that a null reading is secured on the milli-volt meter 59. Thermocouple 56 is directly subject to the temperature of the heated strand W passing through the metallic tube 55, while the thermocouple 57 is directly subject to the temperature in the chamber or compartment. With everything in balance and the apparatus properly adjusted, a null reading will continue. However, if the temperature of the wire W moving through the metallic tube should rise or fall, a differential current will flow to the meter 59, which may be calibrated in a number of different ways to give a useful indication. For example, it may be calibrated to indicate the difference in temperature between the wire and the desired temperature which produced the null reading. Thus, even though the wire is moving at a rapid rate it is possible to measure the temperature thereof either to note its rise or fall or to provide a direct reading of the temperature thereon. If, for example, the normal desired temperature of the strand is 300° C. and the apparatus is in a state of balance and properly adjusted to give a null reading, then any rise or fall in the temperature of the wire will be directly reflected on the meter 59, which may be calibrated to indicate an increase or decrease of temperature with respect to the desired temperature of 300° C.

It is, of course, apparent that the heating element 71 and the heat supplied to the thermocouple chamber from the heated wire and by what other external sources as may be employed, will cause a substantially fixed temperature in the thermocouple compartment when the apparatus is running properly and is in a state of equilibrium.

Other ways of calibrating and using this equipment will be apparent to those skilled in the art, and I do not, therefore, desire to be limited to the disclosure as given for purposes of illustration but rather to the scope of the appended claim.

What I claim is:

A device for measuring the temperature of a moving heated strand comprising a housing through which the strand moves axially and which heats the atmosphere within the housing, a heat conducting tube in said housing through which the strand moves, a thermocouple in contact with said tube, a second thermocouple spaced from said tube and exposed to the atmosphere in said housing, an indicating device, and circuit connections for connecting said thermocouples in series opposition to each other and to said indicating device.

RICHARD L. FEARN.